(12) United States Patent
Xie et al.

(10) Patent No.: US 12,180,358 B2
(45) Date of Patent: Dec. 31, 2024

(54) FLUORINE-CONTAINING RESIN COMPOSITION AND METHOD FOR PRODUCTION THEREOF

(71) Applicants: TSINGHUA UNIVERSITY, Beijing (CN); DAIKIN INDUSTRIES, LTD., Osaka (JP)

(72) Inventors: Xuming Xie, Beijing (CN); Masaji Komori, Osaka (JP); Hideki Kono, Osaka (JP)

(73) Assignees: TSINGHUA UNIVERSITY, Beijing (CN); DAIKIN INDUSTRIES, LTD., Osaka (JP)

( * ) Notice: Subject to any disclaimer, the term of this patent is extended or adjusted under 35 U.S.C. 154(b) by 945 days.

(21) Appl. No.: 17/256,872

(22) PCT Filed: Jun. 24, 2019

(86) PCT No.: PCT/JP2019/024857
§ 371 (c)(1),
(2) Date: Dec. 29, 2020

(87) PCT Pub. No.: WO2020/008923
PCT Pub. Date: Jan. 9, 2020

(65) Prior Publication Data
US 2021/0253841 A1  Aug. 19, 2021

(30) Foreign Application Priority Data
Jul. 2, 2018  (CN) .......................... 201810708396.3

(51) Int. Cl.
*C08L 27/12*  (2006.01)
(52) U.S. Cl.
CPC .................................... *C08L 27/12* (2013.01)
(58) Field of Classification Search
CPC .... C08F 114/24; C09K 19/00; C08J 2327/12; C08J 2467/04; C08L 27/12; C08L 67/04
See application file for complete search history.

(56) References Cited

U.S. PATENT DOCUMENTS

| | | | |
|---|---|---|---|
| 4,386,174 A | 5/1983 | Cogswell et al. | |
| 4,433,083 A | 2/1984 | Cogswell et al. | |
| 4,438,236 A | 3/1984 | Cogswell et al. | |
| 5,670,593 A | 9/1997 | Araki et al. | |
| 2002/0193533 A1* | 12/2002 | Kamo | B29C 48/40 |
| | | | 524/439 |
| 2013/0085220 A1 | 4/2013 | Supriya et al. | |
| 2016/0027970 A1* | 1/2016 | Shatalov | H01L 24/97 |
| | | | 438/27 |
| 2019/0210339 A1* | 7/2019 | Kuwajima | B32B 25/08 |

FOREIGN PATENT DOCUMENTS

| | | |
|---|---|---|
| EP | 0 492 645 A2 | 7/1992 |
| EP | 1 130 056 A2 | 9/2001 |
| JP | 56-115357 A | 9/1981 |
| JP | 63-230756 A | 9/1988 |
| JP | 2-032147 A | 2/1990 |
| JP | 02-110156 A | 4/1990 |
| JP | 4-224853 A | 8/1992 |
| JP | 2817922 B2 * | 10/1998 |
| JP | 2002-265729 A | 9/2002 |
| JP | 2010-77397 A | 4/2010 |
| JP | 2014-528492 A | 10/2014 |
| WO | 95/33782 A1 | 12/1995 |

OTHER PUBLICATIONS

JP-2817922-B2 abstract (Oct. 30, 1998).*
International Search Report for PCT/JP2019/024857 dated Jul. 10, 2019.
International Preliminary Report on Patentability with Translation of Written Opinion dated Jan. 5, 2021, in International Application No. PCT/JP2019/024857.
Extended European Search Report for counterpart EP Appln. No. 19829743.4 dated Feb. 9, 2022.

* cited by examiner

*Primary Examiner* — Ana L. Woodward
(74) *Attorney, Agent, or Firm* — Sughrue Mion, PLLC

(57) ABSTRACT

Provided are a fluororesin-containing composition having significantly improved fluidity and a method for producing the same. The fluororesin-containing composition contains 99.99 to 97% by mass of a fluororesin having a melting point of 205° C. to 225° C. and 0.01 to 2% by mass of a thermotropic liquid crystal polymer. The method for producing the fluororesin-containing composition includes kneading polychlorotrifluoroethylene and a thermotropic liquid crystal polymer at 285° C. to 320° C.

6 Claims, No Drawings

FLUORINE-CONTAINING RESIN COMPOSITION AND METHOD FOR PRODUCTION THEREOF

CROSS-REFERENCE TO RELATED APPLICATIONS

This application is a National Stage of International Application No. PCT/JP2019/024857 filed Jun. 24, 2019, which claims priority under U.S.C. § 119 (a) to Chinese Patent Application No. 201810708396.3 filed on Jul. 2, 2018.

TECHNICAL FIELD

The disclosure relates to fluororesin-containing compositions and methods for producing the same.

BACKGROUND ART

Patent Literature 1 discloses a composition containing a fluororesin and a thermotropic liquid crystal polymer. Unfortunately, the compositions discussed in the examples contain a thermotropic liquid crystal polymer in an amount of at least 10% by mass and only mechanical properties are evaluated.

Patent Literature 2 discloses a composition containing a fluororesin and a thermotropic liquid crystal polymer. Unfortunately, disclosed is only a composition containing a thermotropic liquid crystal polymer in an amount of 40 to 60% by mass.

Patent Literature 3 discloses a composition containing a fluororesin and a thermotropic liquid crystal polymer. Unfortunately, disclosed is only a composition containing a thermotropic liquid crystal polymer in an amount of 20 to 80% by mass.

Patent Literature 4 discloses a composition containing a thermotropic liquid crystal polymer and a plastic such as a commodity plastic or an engineering plastic. However, the Patent Literature discloses the amount of the thermotropic liquid crystal polymer as 3 to 90% by mass and fails to mention fluororesins.

CITATION LIST

Patent Literature

Patent Literature 1: JP H02-110156 A
Patent Literature 2: JP H02-32147 A
Patent Literature 3: JP S63-230756 A
Patent Literature 4: JP 56-115357 A

SUMMARY OF INVENTION

Technical Problem

The disclosure aims to provide a fluororesin-containing composition having significantly improved fluidity and a method for producing the same.

Solution to Problem

The disclosure relates to a fluororesin-containing composition containing 99.99 to 97% by mass of a fluororesin having a melting point of 205° C. to 225° C. and 0.01 to 3% by mass of a thermotropic liquid crystal polymer.

The fluororesin is preferably polychlorotrifluoroethylene.

The fluororesin-containing composition preferably contains 99.9 to 98% by mass of the polychlorotrifluoroethylene and 0.1 to 2% by mass of the thermotropic liquid crystal polymer.

The polychlorotrifluoroethylene preferably has a melt flow rate MFR at 280° C. of 0.1 to 1.0 g/10 min.

The thermotropic liquid crystal polymer preferably has a liquid crystal transition starting temperature of 200° C. to 260° C.

The thermotropic liquid crystal polymer is preferably a copolymer of para-hydroxybenzoic acid and ethylene terephthalate.

The disclosure also relates to a fluororesin-containing composition containing 90% by mass or more of polychlorotrifluoroethylene and having a melt flow rate MFR at 280° C. of 3 to 40 g/10 min.

The disclosure also relates to a method for producing the fluororesin-containing composition, including kneading polychlorotrifluoroethylene and a thermotropic liquid crystal polymer at 285° C. to 320° C.

Advantageous Effects of Invention

The fluororesin-containing composition of the disclosure, containing a small amount of a thermotropic liquid crystal polymer, can significantly improve the fluidity while maintaining excellent properties of a fluororesin. The fluororesin-containing composition thereby has improved extrusion moldability and enables injection molding of a fluororesin, which has been difficult. Such a small amount of the thermotropic liquid crystal polymer can significantly improve the moldability without deteriorating the properties of a fluororesin (e.g., mechanical strength and vapor permeability of polychlorotrifluoroethylene).

DESCRIPTION OF EMBODIMENTS

The inventors found that addition of a small amount of a thermotropic liquid crystal polymer to a fluorine-containing resin can significantly improve the fluidity and thereby completed the fluororesin-containing composition of the disclosure.

Hereinafter, the disclosure is described in detail.

The fluororesin-containing composition of the disclosure contains 99.99 to 97% by mass of a fluororesin having a melting point of 205° C. to 225° C. and 0.01 to 3% by mass of a thermotropic liquid crystal polymer.

The fluororesin has a melting point of 205° C. to 225° C., preferably 210° C. to 216° C. The melting point herein means a temperature corresponding to the maximum value on a heat-of-fusion curve drawn using a differential scanning calorimeter (DSC) at a temperature-increasing rate of 10° C./min.

The fluororesin having a melting point of 205° C. to 225° C. may be any fluororesin satisfying this melting point range, and examples thereof include polychlorotrifluoroethylene (PCTFE), ethylene tetrafluoroethylene (ETFE), and tetrafluoroethylene-hexafluoropropylene-vinylidene fluoride (THV). Preferred among these is polychlorotrifluoroethylene in terms of low fluidity of the fluororesin and a better effect of improving the fluidity.

Examples of the PCTFE used in the present invention include a chlorotrifluoroethylene (CTFE) homopolymer and a copolymer of a polymerized unit based on CTFE ("CTFE unit") and a polymerized unit based on a monomer (a) polymerizable with CTFE ("monomer (a) unit").

The PCTFE preferably contains CTFE units in an amount of 90 to 100 mol %. In terms of excellent moisture proof properties, the amount of CTFE units is more preferably 98 to 100 mol %, still more preferably 99 to 100 mol %.

In the case where the PCTFE is a copolymer of a CTFE unit and a monomer (a) unit, the monomer (a) may be any monomer copolymerizable with CTFE, and examples thereof include tetrafluoroethylene (TFE), ethylene (Et), vinylidene fluoride (VdF), perfluoro(alkyl vinyl) ether (PAVE), a vinyl monomer represented by the following formula (I):

$$CX^3X^4\!=\!CX^1(CF_2)_nX^2 \qquad (I)$$

(wherein $X^1$, $X^3$, and $X^4$ are the same as or different from each other and are each a hydrogen atom or a fluorine atom; $X^2$ is a hydrogen atom, a fluorine atom, or a chlorine atom; and n is an integer of 1 to 10), and an alkyl perfluorovinyl ether derivative represented by the following formula (II):

$$CF_2\!=\!CF\!-\!OCH_2\!-\!Rf \qquad (II)$$

(wherein Rf is a C1-C5 perfluoroalkyl group).

Examples of the PAVE include perfluoro(methyl vinyl ether) (PMVE), perfluoro(ethyl vinyl ether) (PEVE), perfluoro(propyl vinyl ether) (PPVE), and perfluoro(butyl vinyl ether).

Examples of the vinyl monomer represented by the formula (I) include, but are not limited to, hexafluoropropylene (HFP), perfluoro(1,1,2-trihydro-1-hexene), perfluoro(1,1,5-trihydro-1-pentene), and a perfluoro(alkyl) ethylene represented by the following formula (III):

$$H_2C\!=\!CX^5Rf^3 \qquad (III)$$

(wherein $X^5$ is H, F, or $CF_3$, and $Rf^3$ is a C1-C10 perfluoroalkyl group). The perfluoro(alkyl) ethylene is preferably perfluoro(butyl) ethylene.

The alkyl perfluorovinyl ether derivative represented by the formula (II) is preferably one in which Rf is a C1-C3 perfluoroalkyl group, more preferably $CF_2\!=\!CF\!-\!OCH_2\!-\!CF_2CF_3$.

The monomer (a) polymerizable with CTFE preferably includes at least one selected from the group consisting of TFE, Et, VdF, PAVE, and a vinyl monomer represented by the formula (I). One kind or two or more kinds of the monomer (a) may be used.

The monomer (a) may also be an unsaturated carboxylic acid copolymerizable with CTFE. Examples of the unsaturated carboxylic acid include, but are not limited to, C3-C6 unsaturated aliphatic carboxylic acids such as (meth)acrylic acid, crotonic acid, maleic acid, fumaric acid, itaconic acid, citraconic acid, mesaconic acid, and aconitic acid. The monomer (a) may also be a C3-C6 unsaturated aliphatic polycarboxylic acid.

Examples of the unsaturated aliphatic polycarboxylic acid include, but are not limited to, maleic acid, fumaric acid, itaconic acid, citraconic acid, mesaconic acid, and aconitic acid. Among these, those which can be in the form of an acid anhydride, such as maleic acid, itaconic acid, and citraconic acid, may be in the form of an acid anhydride.

Two or more kinds of the monomer (a) may be used. Still, in case that monomer (a) is a monomer such as VDF, PAVE, or HFP, the monomer (a) does not need to be used in combination with itaconic acid, citraconic acid, or an acid anhydride thereof.

The PCTFE preferably has a melt flow rate (MFR) of 0.1 to 1 g/10 min. The MFR is a value obtained by measurement under the conditions of a temperature of 280° C. and a load of 10.0 kg in accordance with ASTM D3307.

The fluororesin-containing composition contains the fluororesin in an amount of 99.99 to 97% by mass, preferably 99.9 to 98% by mass. The fluororesin-containing composition contains the thermotropic liquid crystal polymer in an amount of 0.01 to 3% by mass, preferably 0.1 to 2% by mass. Less than 97% by mass of the fluororesin tends to reduce the mechanical strength, while more than 99.99% by mass thereof tends to reduce an effect of improving the fluidity.

The thermotropic liquid crystal polymer may be any polymer that becomes a liquid crystal state such as a nematic state by heating, and examples thereof include: type-I liquid crystal polymers (e.g., a biphenol/benzoic acid/para-hydroxybenzoic acid (POB) copolymer); type-II liquid crystal polymers (e.g., a hydroxynaphthoic acid (HNA)/POB copolymer); and type-III liquid crystal polymers (e.g., a POB/ethylene terephthalate copolymer). Preferred among these are type-III liquid crystal polymers such as a POB/ethylene terephthalate copolymer in terms of the kneading temperature and the liquid crystal transition temperature.

The amount of the POB units copolymerized in the POB/ethylene terephthalate copolymer is not limited and is preferably 20 to 80 mol %, more preferably 30 to 70 mol %. Less than 20 mol % of the amount copolymerized tends to fail to provide sufficient liquid crystallinity, while more than 80 mol % thereof tends to give too rigid molecular chain in the polymer, leading to too high a liquid crystal starting temperature.

The liquid crystal transition starting temperature of the thermotropic liquid crystal polymer is preferably, but is not limited to, a temperature not higher than the processing temperature of the fluororesin. For example, since the processing temperature of PCTFE is 280° C. or higher, the liquid crystal transition starting temperature is preferably 280° C. or lower, more preferably 200° C. to 260° C., still more preferably 210° C. to 240° C. A liquid crystal transition starting temperature of lower than 200° C. tends to cause decomposition of the liquid crystal polymer at a kneading temperature to reduce the dispersion effect, while a liquid crystal transition starting temperature of higher than 260° C. tends to increase the melt viscosity at a kneading temperature to fail to achieve an effect of improving the fluidity. The liquid crystal starting temperature herein means a temperature at which a thermotropic liquid crystal polymer mounted on the sample holder of a polarization microscope becomes opalescent by heating under shear stress.

The melt flow rate MFR of the fluororesin-containing composition of the disclosure is preferably, but is not limited to, 3 to 40 g/10 min at 280° C., more preferably 5 to 30 g/10 min at 280° C. A melt flow rate MFR of lower than 3 g/10 min causes too high a melt viscosity to cause defects during injection molding, while a melt flow rate MFR of higher than 40 g/10 min tends to reduce the mechanical strength.

Also, the fluororesin-containing composition of the disclosure contains 90% by mass or more of polychlorotrifluoroethylene and has a melt flow rate MFR at 280° C. of 3 to 40 g/10 min.

The fluororesin-containing composition of the disclosure may contain different components in addition to the fluororesin and the thermotropic liquid crystal polymer. Examples of the different components include reinforcing fibers, fillers, plasticizers, processing aids, mold lubricants, pigments, flame retarders, lubricants, light stabilizers, weathering agents, conducting agents, antistatic agents, ultraviolet absorbers, antioxidants, foaming agents, perfumes, oils, softeners, dehydrofluorinating agents, and nucleating agents. Examples of the reinforcing fibers include carbon fibers, glass fibers, and basalt fibers. Examples of the fillers include polytetrafluoroethylene, mica, silica, talc, cerite, clay, titanium oxide, and barium sulfate. An example of the conducting agents is carbon black. Examples of the plasticizers include dioctyl phthalic acid and pentaerythritol. Examples of the processing aids include carnauba wax, sulfone compounds, low molecular weight polyethylene, and fluorine-based aids. Examples of the dehydrofluorinating agents include organic oniums and amidines.

Also, the method for producing a fluororesin-containing composition of the disclosure includes kneading polychlorotrifluoroethylene and a thermotropic liquid crystal polymer at 285° C. to 320° C.

Kneading may be performed with any tool such as an open roll, a Banbury mixer, a pressure kneader, or an extruder. Preferred among these is a pressure kneader or an extruder such as a biaxial extruder in terms of applying a high shear force.

Melt kneading is preferably performed at a temperature not lower than the melting point of PCTFE and not higher than the decomposition temperature thereof. Specifically, the temperature is preferably 250° C. to 360° C., more preferably 285° C. to 320° C. Melt kneading at a temperature lower than 250° C. tends to inhibit dispersing, while melt kneading at a temperature higher than 360° C. tends to reduce the molecular weight of the fluorine-containing resin, leading to reduced strength.

The fluororesin-containing composition of the disclosure and a fluororesin-containing composition obtained by the production method of the disclosure can be molded by extrusion molding, injection molding, or the like. Obtained molded articles can be used for various applications such as semiconductor-related articles, drug wrapping films, barrier films, industrial equipment, electrical components, and automotive components.

EXAMPLES

The disclosure is described with reference to examples, but the examples are not intended to limit the disclosure.

Materials used in the examples and comparative examples are listed below.

Polychlorotrifluoroethylene: CTFE 100 mol %, melting point 211° C., MFR at 280° C.: 0.49 g/10 min Thermotropic liquid crystal polymer: X7G (available from Eastman Kodak Company), liquid crystal starting temperature: 245° C., amount of para-hydroxybenzoic acid units copolymerized: 40 mol % was injection molded with an injection molder set to have a cylinder temperature of 270° C. to 300° C., a nozzle temperature of 300° C., and a mold temperature of 100° C. to provide a dumbbell specimen and a bending specimen.

Comparative Example 1

PCTFE was injection molded with an injection molder set to have a cylinder temperature of 300° C. to 330° C., a nozzle temperature of 330° C., and a mold temperature of 100° C. to provide a dumbbell specimen and a bending specimen.

<Melt Flow Rate (MFR)>

The MFR was determined as the mass (g/10 min) of the polymer that was held at 280° C. for five minutes and then flew out of a nozzle having an inner diameter of 2.095 mm and a length of 8 mm per 10 minutes and under a load of 10 kg using a melt indexer (available from Toyo Seiki Seisakusho, Ltd.) in accordance with ASTM D1238.

<Tensile Properties>

Each of the resulting dumbbell specimens was subjected to a tensile test using a Tensilon universal material testing instrument (available from A&D Company, Limited) at a speed of 50 mm/min, and the tensile breaking strength and the tensile elongation at break were determined in accordance with ASTM D638.

<Bending Properties>

Each of the resulting bending specimens was subjected to a bending test with a Tensilon universal material testing instrument (available from A&D Company, Limited) at a speed of 2 mm/min, and the bending strength and the flexural modulus were determined in accordance with ASTM D790.

<Heat Deflection Temperature>

The heat deflection temperature of each resulting bending specimen was determined as a temperature at which the deflection value reached 0.254 mm under a load of 1.83 MPa using a heat distortion tester (available from YASUDA SEIKI SEISAKUSHO, LTD.) in accordance with ASTM D648.

<Vapor Permeability>

A film formed by press molding the composition was cut into a 50 mm×50 mm size. A 30-mm diameter filter was set beside the film, and the water vapor transmission rate of the film was measured in accordance with JIS K7129 (method A) using water vapor transmission rate tester L80-5000 (available from Dr. Lyssy).

TABLE 1

| Example No. | LCP parts by mass | MFR at 280° C., 10 kg | Tensile properties | | Bending properties | | Heat deflection temperature ° C | Vapor permeability g/m²day |
|---|---|---|---|---|---|---|---|---|
| | | | Strength MPa | Elongation at break % | Strength MPa | Flexural modulus MPa | | |
| Comparative Example 1 | 0.0 | 0.49 | 48 | 10 | 67 | 1700 | 73 | 0.22 |
| Example 1 | 0.5 | 14.8 | 49 | 12 | 69 | 2040 | 73 | 0.14 |
| Example 2 | 1.0 | 24.7 | 48 | 8 | 65 | 2130 | 72 | 0.17 |

Examples 1 and 2

A fluororesin-containing composition was produced at the liquid crystal polymer content shown in Table 1 by kneading with a biaxial extruder at a cylinder temperature of 290° C. to 315° C. The resulting fluororesin-containing composition In spite of the fact that the fluororesin-containing composition in Example 1 contained a liquid crystal polymer in an amount of as small as 0.5 parts by mass, the MFR of the polychlorotrifluoroethylene was significantly increased from 0.49 g/10 min to 14.8 g/10 min, which was an about 25 times increase, and thus the fluidity was significantly improved. As a result, the PCTFE could be injection molded even when the molding temperature was reduced to 300° C. from 320° C. to 330° C.

As for the mechanical properties, the flexural modulus was improved, while the tensile strength, bending strength, heat deflection temperature, and vapor permeability were hardly changed.

Also, in spite of the fact that the fluororesin-containing composition in Example 2 contained a liquid crystal polymer in an amount of as small as 1 part by mass, the MFR was significantly increased by about 50 times, and thus the fluidity was significantly improved. As for the mechanical properties, the flexural modulus was improved, while the tensile strength, bending strength, heat deflection temperature, and vapor permeability were hardly changed.

INDUSTRIAL APPLICABILITY

The fluororesin-containing composition of the disclosure has significantly improved fluidity and thus is suitably used for extrusion molding and injection molding.

The invention claimed is:

1. A fluororesin-containing composition consisting of:
99.5 to 99.99% by mass of a fluororesin having a melting point of 205° C. to 225° C.; and
0.01 to 0.5% by mass of a thermotropic liquid crystal polymer,
wherein the thermotropic liquid crystal polymer is a copolymer of para-hydroxybenzoic acid and ethylene terephthalate, and
the thermotropic liquid crystal polymer contains the para-hydroxybenzoic acid in an amount of 20 to 80 mol %.

2. The fluororesin-containing composition according to claim 1,
wherein the fluororesin is polychlorotrifluoroethylene.

3. The fluororesin-containing composition according to claim 1,
wherein the fluororesin is polychlorotrifluoroethylene, and
the polychlorotrifluoroethylene has a melt flow rate MFR at 280° C. of 0.1 to 1.0 g/10 min.

4. The fluororesin-containing composition according to claim 1,
wherein the thermotropic liquid crystal polymer has a liquid crystal transition starting temperature of 200° C. to 260° C.

5. A method for producing the fluororesin-containing composition according to claim 1, comprising kneading the fluororesin and the thermotropic liquid crystal polymer at 285° C. to 320° C., wherein the fluororesin is polychlorotrifluoroethylene.

6. A fluororesin-containing composition comprising 99.5% by mass or more of polychlorotrifluoroethylene based on 100% by mass of a total of the fluorineresin-containing composition and 0.1 to 0.5% by mass of a thermotropic liquid crystal based on 100% by mass of the total of the fluorineresin-containing composition, and having a melt flow rate MFR at 280° C. of 3 to 40 g/10 min, and
wherein the thermotropic liquid crystal polymer is a copolymer of para-hydroxybenzoic acid and ethylene terephthalate, and
the thermotropic liquid crystal polymer contains the para-hydroxybenzoic acid in an amount of 20 to 80 mol %.

* * * * *